United States Patent Office 3,052,711
Patented Sept. 4, 1962

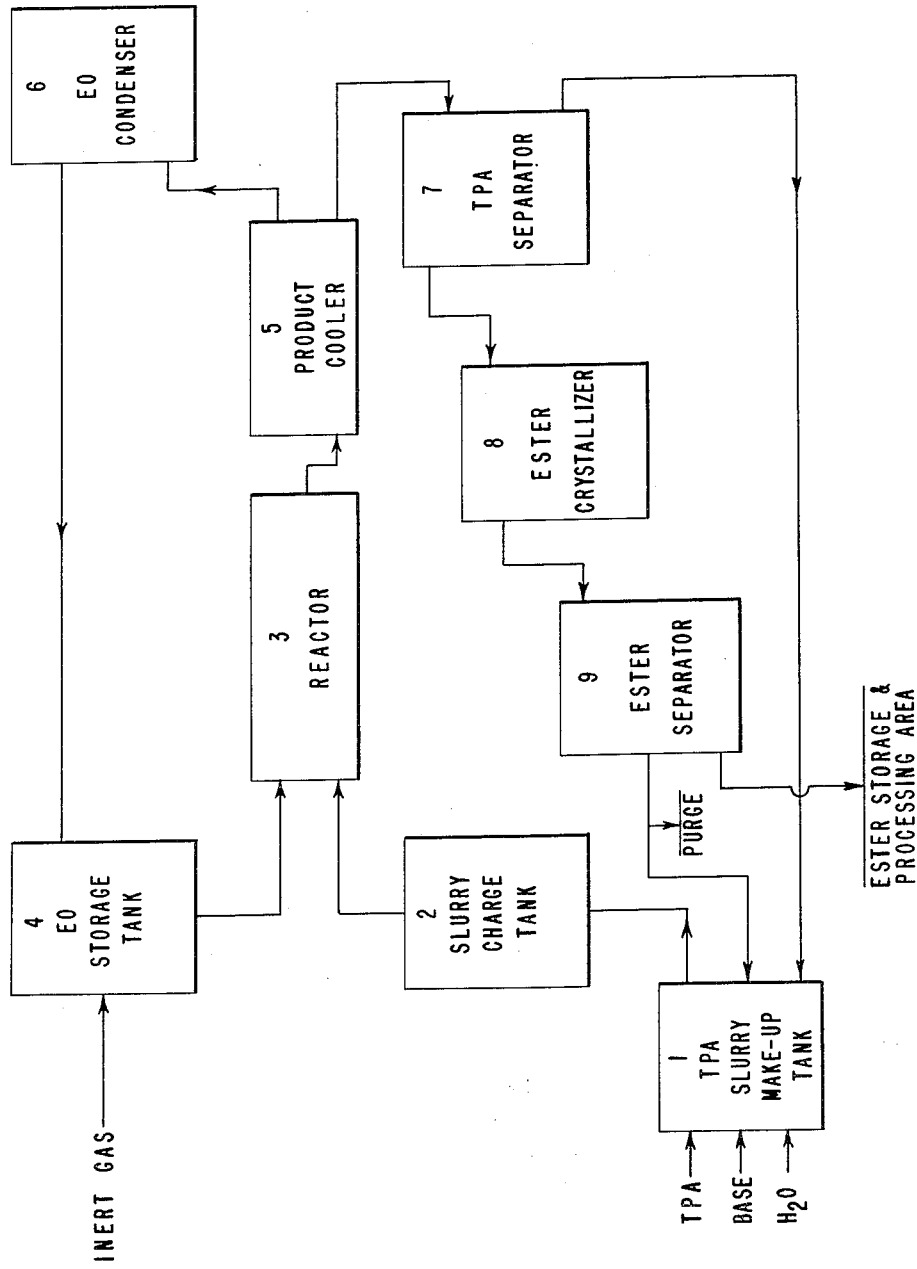

3,052,711
PRODUCTION OF DI(β-HYDROXYETHYL) TEREPHTHALATE
Richard C. Glogau, West Chester, Pa., and Robert H. Weir, Pitman, N.J., assignors to E. I. du Pont de Nemours and Company, Wilmington, Del., a corporation of Delaware
Filed Apr. 20, 1960, Ser. No. 23,561
8 Claims. (Cl. 260—475)

The present invention relates to a process for the preparation of di(β-hydroxyethyl) terephthalate. More particularly, the present invention relates to an improved, continuous process for preparing di(β-hydroxyethyl) terephthalate in large quantities and in high yields from terephthalic acid and ethylene oxide.

The present application is a continuation-in-part of our co-pending application Serial No. 758,586, filed September 2, 1958, and now abandoned.

Di(β-hydroxyethyl) terephthalate (hereafter referred to as DHET) is a useful intermediate in the preparation of polymers and finds important commercial use in the preparation of polyethylene terephthalate. For polymerization, either alone or with other polymer-forming comonomers, it is extremely important that the DHET starting material be substantially free of contaminants, especially those containing ether linkages, i.e., esters of terephthalic acid with glycols which contain ether oxygen in the chain, such as diethylene glycol. In the case of homopolymerization of DHET, the presence of impurities in the monomeric starting material, especially impurities containing ether linkages, will have a profoundly deleterious effect on the physical properties of the polyester and accordingly will markedly reduce its suitability for use in the preparation of polyester films and fibers.

The preparation of DHET from terephthalic acid and ethylene oxide is known. Because the reaction of gaseous or liquid ethylene oxide with solid terephthalic acid is extremely slow, a solvent is generally used. Terephthalic acid is relatively insoluble in most common solvents. For example, its solubility in water at 100° C. is less than 0.1%. The salts of terephthalic acid and a strong base, for example an alkali metal hydroxide, are quite soluble in water, but in an alkaline medium do not react with ethylene oxide to form the desired ester. However, if only a portion of the terephthalic acid in an aqueous medium is in the form of an alkali-metal or other water-soluble salt, the pH of the medium can be maintained at about 6 and the ethylene oxide will combine with the dissolved terephthalate, the liberated base reacting with solid terephthalic acid to solubilize it, and thus facilitate the desired esterification.

The inherent difficulty in the foregoing procedure lies in the fact that ethylene oxide is hydrated to ethylene glycol and higher glycols in an acidic medium at elevated temperatures. Consequently, prior art workers considered it essential to carry out the reaction at temperatures below 120° C. to suppress this side reaction. Also, because a mole ratio of water to terephthalic acid of about 10 to 1 is required for a mobile slurry, and initially only about 10% of the terephthalic acid is in solution, and thus available to react with the ethylene oxide, staged addition of the ethylene oxide has been advocated in order to avoid having excess ethylene oxide present to react with the water in the system. The mole ratio of water to dissolved terephthalic acid is thus about 100/1 or greater during the reaction.

The foregoing limitations make the prior art techniques for reacting terephthalic acid with ethylene oxide inconvenient to operate on a commercial scale and have a deleterious effect on the space-time yield of the process. Additionally, the conversions to the desired DHET, particularly based on ethylene oxide, are poor.

Accordingly, it is an object of the present invention to provide an improved process for preparing DHET in high conversions and yields. Another object of the invention is to provide a continuous process for preparing DHET which is convenient and economical to operate on a commercial scale. A still further object of the invention is to provide a continuous process for preparing DHET in considerably higher space-time yields than have been achievable heretofore. Other and additional objects will become apparent from the following specification and claims.

We have found that the foregoing and related objects are achieved, and the disadvantages of the prior processes are overcome, when contact of the terephthalic acid and the ethylene oxide in the presence of water and a soluble catalyst, i.e., a dissolved terephthalate, is effected continuously in such manner that considerably higher temperatures are achieved for markedly shorter periods of time than were used heretofore in this reaction and, additionally, in such manner that reaction in the contacted mass thereafter is brought rapidly to a halt.

The process of the present invention stems from the surprising discovery that the poor yields of DHET obtained by prior art workers at temperatures above 120° C. do not result because of a preferential increase in the rate of hydration of ethylene oxide at higher temperatures, but rather that the loss in yield of DHET is actually due to the consecutive hydrolytic reaction of DHET at the higher temperatures. We have discovered that the hydrolytic reaction can be effectively depressed by carrying out the reaction during a short interval of time and thereafter immediately quenching the reaction mixture to prevent loss of DHET. Thus, the apparent necessity for staged addition of ethylene oxide and operation at low temperature is obviated.

In accordance with the improved process of the present invention, a reaction mass is prepared by continuously feeding ethylene oxide and a slurry prepared from terephthalic acid, water, and a water-soluble base, e.g., an alkali-metal hydroxide, into one end of a heated reaction zone which has its greatest dimension in the direction of flow of the mass and is maintained at a temperature between about 140 and 200° C. under a pressure at least sufficient to maintain the major part of the mass in the liquid phase. The reaction mass is continuously discharged from the other end of the heated reaction zone into a cooling zone to bring the mass quickly down to a temperature of about 60 to 100° C. after the mass has been subjected to the temperature conditions of the heated zone for a period of from about 0.5 to 5 minutes. The feed streams into the heated reaction zone are so fed that intimate mixing of the mass occurs, and we have found that particularly good results are achieved under our process conditions when the feed streams provide, per mole of terephthalic acid fed, from about 1.8 to 2.8 moles of ethylene oxide, from about 6 to 20 moles of water, and from about 0.10 to 0.50 mole of the water-soluble base.

In order that the present invention may be more fully understood, attention is directed to the accompanying flowsheet which depicts a simple method of continuously preparing DHET according to the present invention. In the flowsheet, each unit is labeled with a descriptive name and the direction of flow from and to each unit is indicated by an arrow on the connecting line. For simplicity, representation of such obvious details as regulating valves, pumps, and agitating means has been omitted. On the flowsheet, terephthalic acid and ethylene oxide are indicated by the abbreviations "TPA" and "EO," respectively.

The operation of the process represented by the flowsheet is as follows: In make-up tank 1 provided with conventional agitation means, an aqueous slurry is prepared from suitable proportions of terephthalic acid, water, a water-soluble base, and, after the start of the process, optionally an aqueous solution containing dissolved terephthalic acid as a water-soluble salt (usually a neutral salt) together with ethylene glycol and minor amounts of diethylene glycol, both by-products of the process. This slurry is fed from tank 1 to terephthalic acid slurry charge tank 2 and from there into one end of reactor 3. Simultaneously with the feed from tank 2 into reactor 3, there is fed from storage tank 4 into the same end of reactor 3 a stream of ethylene oxide. This ethylene oxide feed is maintained in the liquid state and propelled by a stream of pressurized inert gas, such as nitrogen.

Reactor 3 is an elongated vessel or pipe, i.e., has its greatest dimension in the direction of reactant flow, and is provided with conventional heating and cooling means, such as jacketing and steam and cooling water lines, for maintaining the required temperatures. A conventional agitation means may be provided in reactor 3, but this is not essential since entirely adequate mixing of the reactants may be achieved by operating under conditions of turbulent flow, i.e., at a Reynolds number of at least 2500.

The reaction mass obtained by the mixing of the streams flows to the end of reactor 3 where it discharges into product cooler 5, the dimensions of the vessels and lines and the rate of flow therethrough into cooler 5 being so chosen that the mass is maintained in the required reaction temperature range for a suitable period of time. As will be described more fully hereinafter, the product cooler 5 is maintained at temperatures well below the temperatures maintained in the reactor, so that reaction in the mass discharging from reactor 3 is rapidly quenched, i.e., rapidly brought to a halt, but the mass is maintained above the crystallization temperature of the ester products. Cooler 5 may initially be under pressure and vented during or after the cooling, or it may initially be at atmospheric pressure. In either case, as the pressure drops, any unreacted ethylene oxide will flash (evaporate) from the mass and, after being passed through suitable means (not shown) for condensing any water flashed therewith, can be condensed in a conventionally cooled condenser 6 for recycle to ethylene oxide storage tank 4 and re-use in the process.

The main reaction mass flows from cooler 5 into separator 7, which is maintained in the same temperature range as cooler 5, for removal of any unreacted solid terephthalic acid by conventional means, i.e., filtration or centrifuging. The solid terephthalic acid recovered is suitable for recycle to slurry make-up tank 1 and subsequent re-use in the process.

The liquid product from separator 7 overflows into ester crystallizer 8, where the temperature is maintained sufficiently low by conventional cooling means for crystallization of the major product, DHET, together with lesser amounts of the partially esterified product, mono($\beta$-hydroxyethyl) terephthalate. From 8, the mass passes into ester separator 9, i.e., a centrifuge or filter, for separation of the desired crystalline esters. The acid monoester may, if desired, be removed from the neutral DHET by suspending the mixed solid esters in water in an appropriate vessel (not shown) at ambient temperature and thereafter adding dilute aqueous base to form selectively a water-soluble derivative of the monoester, i.e., a salt of the type:

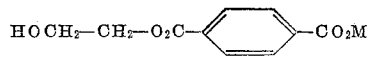
$$HOCH_2-CH_2-O_2C-\underset{}{\bigcirc}-CO_2M$$

where M signifies the cation portion of a water-soluble base. However, this procedure is unnecessary if the ester product is to be polymerized, since the presence of the monoester is not deleterious in the preparation of the polyester.

If desired, the liquid residue or filtrate from 9 can be recycled, with a suitable purge, if needed, to slurry make-up tank 1. As was indicated above, this filtrate principally contains a water-soluble salt of terephthalic acid, together with ethylene glycol and minor amounts of diethylene glycol formed as by-products in the process.

In actual practice, it is possible to combine several of the vessels, such as 1 and 2 or 3 and 5, into suitably partitioned single units. Under certain conditions, it also may be desirable to include additional units of equipment, e.g., a slurry preheater interposed between 1 and 2 as a separate unit or as a part of 1 or 2 or both. Likewise, a separate venting vessel could be positioned between cooler 5 and separator 7, in which case, condenser 6 would be connected to the interposed unit rather than to 5. The design of the equipment used forms no part of the present invention and, hence, the invention is not limited to a particular arrangement of the units.

The following examples are intended to illustrate various embodiments of the invention which, however, should not be construed as limited thereto. In the examples, all parts are by weight, and the conversions reported express the mole percents of the starting materials charged which are converted to the specified products, except in the case of terephthalic acid. The amounts of terephthalic acid charged is corrected to indicate the amount of "available" acid, i.e., the acid fed minus that presumed, for reasons to be described more fully hereinafter, to be bound as the neutral salt.

EXAMPLE 1

The following procedure was employed in carrying out the run of Table I: A mixture of terephthalic acid, water, and sodium hydroxide in the specified molar ratios was placed in a feed tank fitted with a stirrer. Liquid ethylene oxide was loaded in a separate feed tank fitted with a means for adding compressed nitrogen, a pressure gage, and a safety valve set to operate at 350 p.s.i.ga. The latter feed tank was connected to a rotameter and finally to a coiled stainless steel tubular reactor fitted with a means for measuring product temperature. The reaction zone diameter was 0.18 inch and the over-all length was 180 feet. The aqueous terephthalic acid slurry tank likewise was connected by a feed pump to the reactor, which was immersed in a constant temperature bath. The reactor discharge was connected to a pressure receiver equipped with suitable vent lines and pressure gages. The reactor and product receiver were pressurized to 180 p.s.i.ga. by addition of an inert gas (nitrogen), and the reactor bath was heated to maintain a temperature of 165° C. in the reaction zone. The ethylene oxide feed tank likewise was pressurized with nitrogen to 300 p.s.i.ga. The aqueous terephthalic acid slurry was pumped continuously at constant rate into one end of the reaction zone of the tubular reactor where the slurry was mixed with the indicated amount of ethylene oxide, which was forced into the same end of the reaction zone, also at constant rate, by the nitrogen gas pressure in the feed tank. Both the feed rates were sufficiently high that turbulent flow was maintained throughout the reaction zone. The reaction mass discharged continuously from the other end of the reaction zone into the product receiver tank which was maintained at 90° C. The reactor volume and the rate of flow of the reactants in the reactor were such that the retention time of the mass in the 165° C. zone was that specified in the table. From the product receiver, the mass was passed through a filter to separate out any unreacted terephthalic acid. The product receiver was washed with hot water, which likewise was filtered. The filtrates were combined and cooled to below 60° C. to crystallize the DHET and the lesser amounts of mono($\beta$-hydroxyethyl) terephthalate formed. The amounts of these compounds present in the crystalline product were determined by anaylsis.

Table I

| Moles of reagents per mole of TPA[1] fed | | | Reaction zone temp. (°C.) | Retention time (min.) | Conversion of available TPA[1] to percent | | | Conversion of EO[2] to percent | | | DHET space-time yield, lb./(hr.) (cu. ft.) |
|---|---|---|---|---|---|---|---|---|---|---|---|
| H²O | NaOH | EO[2] | | | DHET | MHET[3] | Total | DHET | MHET[3] | Total | |
| 16.7 | 0.17 | 2.17 | 165 | 2.5 | 68.4 | 13.0 | 81.4 | 57.6 | 5.5 | 68.6 | 412 |

[1] TPA = Terephthalic acid.  [2] EO = Ethylene oxide.  [3] MHET = Mono(β-hydroxyethyl) terephthalate.

EXAMPLE 2

The procedure used in the runs of Table II was analogous to that of Example 1, except that the liquid ethylene oxide stream and the slurry prepared from terephthalic acid, sodium hydroxide, and water were simultaneously and continuously fed into one end of a jacketed, steam-heated reactor coil in which the reaction zone diameter was 0.245 inch and the over-all length was 116.7 feet. The pressure in the reaction zone was maintained at about 250 p.s.i.ga. with compressed nitrogen. To facilitate the study of the interrelationships of the process variables, each of the streams was charged at a constant rate sufficiently high to maintain turbulent flow of the resultant reaction mass in the reaction zone, and the reactor was provided near the opposite end with several spaced taps leading to pressurized product receivers for discharge of reaction mass after the retention times specified in the table. After each discharge, the product receivers, which were at about 75° C., were vented immediately. Product analysis also was essentially the same as that used in Example 1, except that the total product was analyzed. i.e., the filtrates remaining after crystallization of the glycol esters of terephthalic acid also were subjected to analysis for glycol content.

Table II

| Run | Moles of reagents per mole of TPA[1] fed | | | Reaction zone temp. (°C.) | Retention time (min.) | Conversion of available TPA[1] to percent | | | EO-conversion to percent | | | | | | | DHET space-time lb. (hr.) (cu. ft.) |
|---|---|---|---|---|---|---|---|---|---|---|---|---|---|---|---|---|
| | H²O | NaOH | EO² | | | DHET | MHET[3] | Total | DHET | MHET[3] | Esters | EG[4] | DEG[5] | Glycols | Esters plus glycols | |
| B-1 | 13.6 | 0.36 | 2.0 | 140 | 0.6 | 59.0 | 11.7 | 70.7 | 32.7 | 3.2 | 35.9 | 9.8 | 0.8 | 10.6 | 46.5 | |
| B-2 | 13.6 | 0.36 | 2.0 | 140 | 1.2 | 82.2 | 17.3 | 99.5 | 44.8 | 4.7 | 49.5 | 23.8 | 2.4 | 26.2 | 75.7 | |
| B-3 | 13.6 | 0.36 | 2.0 | 140 | 3.6 | 95.6 | 1.3 | 96.9 | 54.6 | 0.4 | 55.0 | 41.7 | 3.3 | 45.0 | 100 | 540 |
| C-1 | 11.2 | 0.22 | 2.15 | 140 | 0.6 | 22.7 | 9.0 | 31.7 | 16.4 | 3.3 | 19.7 | 9.8 | 1.6 | 11.4 | 31.1 | |
| C-2 | 11.2 | 0.22 | 2.15 | 140 | 1.2 | 51.1 | 13.9 | 65.0 | 36.4 | 4.9 | 41.3 | 18.4 | 3.1 | 21.5 | 62.8 | |
| C-3 | 11.2 | 0.22 | 2.15 | 140 | 1.7 | 75.3 | 16.0 | 91.3 | 53.3 | 5.7 | 59.0 | 25.1 | 4.3 | 29.4 | 88.4 | |
| C-4 | 11.2 | 0.22 | 2.15 | 140 | 2.9 | 78.4 | 15.2 | 93.6 | 55.6 | 5.4 | 61.0 | 28.4 | 3.8 | 32.2 | 93.2 | |
| C-5 | 11.2 | 0.22 | 2.15 | 140 | 3.5 | 84.2 | 15.1 | 99.3 | 63.1 | 5.7 | 68.8 | 26.5 | 4.7 | 31.2 | 100 | 533 |
| C-6 | 11.2 | 0.22 | 2.15 | 170 | 0.6 | 43.8 | 15.2 | 59.0 | 27.4 | 4.9 | 32.3 | 13.7 | 1.9 | 15.6 | 47.9 | |
| C-7 | 11.2 | 0.22 | 2.15 | 170 | 1.2 | 75.2 | 17.1 | 92.3 | 46.9 | 5.3 | 52.2 | 23.6 | 3.9 | 27.5 | 79.7 | |
| C-8 | 11.2 | 0.22 | 2.15 | 170 | 1.7 | 87.2 | 12.4 | 99.6 | 55.2 | 3.9 | 59.1 | 25.3 | 4.5 | 29.8 | 88.9 | |
| C-9 | 11.2 | 0.22 | 2.15 | 170 | 2.9 | 87.5 | 12.1 | 99.7 | 57.7 | 3.9 | 61.6 | 33.3 | 5.0 | 38.3 | 99.9 | 544 |
| D-1 | 11.3 | 0.24 | 2.15 | 160 | 0.6 | 41.7 | 12.9 | 54.6 | 24.4 | 3.8 | 28.2 | 3.7 | 1.4 | 5.1 | 33.3 | |
| D-2 | 11.3 | 0.24 | 2.15 | 160 | 1.2 | 69.7 | 15.9 | 85.6 | 40.3 | 4.6 | 44.9 | 15.8 | 4.3 | 20.1 | 45.0 | |
| D-3 | 11.3 | 0.24 | 2.15 | 160 | 1.7 | 96.2 | 2.3 | 98.5 | 57.9 | 0.7 | 58.6 | 25.9 | 5.2 | 31.1 | 89.7 | |
| D-4 | 11.3 | 0.24 | 2.15 | 160 | 2.9 | 92.2 | 1.4 | 93.6 | 55.9 | 0.4 | 56.3 | 38.3 | 5.3 | 43.6 | 99.9 | 583 |
| E-1 | 13.8 | 0.08 | 2.38 | 160 | 0.6 | 13.0 | 3.9 | 16.9 | 9.2 | 1.4 | 10.6 | 7.9 | 3.0 | 10.9 | 21.5 | |
| E-2 | 13.8 | 0.08 | 2.38 | 160 | 1.2 | 26.9 | 7.5 | 34.4 | 18.6 | 2.6 | 21.2 | 18.0 | 3.1 | 21.1 | 42.3 | |
| E-3 | 13.8 | 0.08 | 2.38 | 160 | 1.7 | 49.1 | 11.3 | 60.4 | 33.6 | 3.9 | 37.5 | 27.4 | 6.5 | 33.9 | 71.4 | |
| E-4 | 13.8 | 0.08 | 2.38 | 160 | 2.9 | 54.7 | 12.1 | 66.8 | 37.4 | 4.1 | 41.5 | 32.5 | 7.8 | 40.3 | 81.8 | |
| E-5 | 13.8 | 0.08 | 2.38 | 160 | 3.5 | 64.7 | 12.2 | 76.9 | 46.0 | 4.3 | 50.3 | 39.5 | 10.2 | 49.7 | 100 | 370 |
| F-1 | 11.2 | 0.22 | 2.58 | 160 | 0.7 | 41.8 | 18.9 | 60.7 | 25.9 | 5.8 | 31.7 | 3.2 | 1.6 | 4.8 | 36.5 | |
| F-2 | 11.2 | 0.22 | 2.58 | 160 | 1.3 | 74.9 | 20.5 | 95.4 | 46.1 | 6.3 | 52.4 | 17.4 | 3.5 | 20.9 | 73.3 | |
| F-3 | 11.2 | 0.22 | 2.58 | 160 | 2.0 | 89.9 | 6.6 | 96.5 | 57.8 | 2.1 | 59.9 | 20.6 | 4.4 | 25.0 | 84.9 | |
| F-4 | 11.2 | 0.22 | 2.58 | 160 | 3.4 | 93.5 | 3.0 | 96.5 | 61.4 | 1.0 | 62.4 | 30.1 | 7.5 | 37.6 | 100 | 494 |

[1] TPA = Terephthalic acid.  [2] EO = Ethylene oxide.  [3] MHET = Mono (β-hydroxyethyl) terephthalate.  [4] EG = Ethylene glycol.  [5] DEG = Diethylene glycol.

EXAMPLE 3

The conditions and results of syntheses representative of prior art techniques are illustrated in Table III, below, for comparison purposes. The conversions to DHET reported are based on the amounts of this compound isolated from the crystalline portion of the product mixture. The conversions to mono(β-hydroxyethyl) terephthalate are on the same basis, except as otherwise noted. Two assumptions were made in the calculation of the space-time yields in this example: (1) that the reaction mass occupied the entire reaction zone and (2) that the mass had a density of 1.

Table III

| Run | Moles of reagents per mole of TPA[1] fed | | | Reaction zone temp. (°C.) | Retention time (min.) | Conversion of available TPA[1] to percent | | Conversion of EO[2] to percent | | | DHET space-time yield, lb./(hr.) (cu. ft.) |
|---|---|---|---|---|---|---|---|---|---|---|---|
| | H₂O | NaOH | EO[2] | | | DHET | MHET[3] | DHET | MHET[3] | Glycols | |
| G | 22.2 | 0.25 | 2.75 | 95 | 20 | 41 | 2.7 | 25.8 | 0.86 | | 24 |
| H | 8.33 | 0.17 | 2.51 | 92-94 | 69 | 61.5 | | 44.8 | | 20.9 | 18 |

[1] TPA = Terephthalic acid.  [2] EO = Ethylene oxide.  [3] MHET = Mono(β-hydroxyethyl) terephthalate.

EXAMPLE 4

The run set forth in Table IV, below, was carried out in a manner similar to the runs of Example 3 except that a higher temperature was employed, as indicated in the table. The conversions to DHET in Table IV are based on the amount of this compound isolated from the crystalline portion of the product mixture, and the conversions to mono(β-hydroxyethyl) terephthalate are based on the amount of this compound found by analysis in the total reaction product. In calculating the space-time yields in Table IV, the same two assumptions were made which were made in this connection for the runs of Example 3.

the order of 1.5 to 3 minutes are particularly suitable, the longer times of course corresponding to the lower temperatures.

The process of the invention is carried out at a pres-

*Table IV*

| Run | Moles of reagents per mole of TPA [1] fed | | | Reaction zone temp. (° C.) | Retention time (min.) | Conversion of available TPA [1] to percent | | Conversion of EO [2] to percent | | | DHET space-time yield, lb./(hr.) (cu. ft.) |
|---|---|---|---|---|---|---|---|---|---|---|---|
| | $H_2O$ | NaOH | EO [2] | | | DHET | MHET [3] | DHET | MHET [3] | Glycols | |
| J | 8.33 | 0.17 | 1.83 | 160 | 75 | 36.1 | 18 | 36.1 | 9 | 38 | 10 |

[1] TPA = Terephthalic acid.   [2] EO = Ethylene oxide.   [3] MHET = Mono(β-hydroxyethyl) terephthalate.

A comparison of Examples 1 and 2 with Examples 3 and 4 immediately makes apparent the fact that the process of the present invention for preparing DHET from terephthalic acid and ethylene oxide constitutes a marked improvement over the previously known procedures with respect to the space-time yields obtained. However, as run J of Example 4 makes particularly clear, this considerable improvement in the utilization of materials and equipment is not achieved merely by raising the reaction temperature to a range above that used by prior art workers in order to increase the rate of the desired reaction. Rather, for good yields of the desired ester and over-all process efficiency, it also is critical that the reactants be brought rapidly into the higher temperature range and that the resulting mass be rapidly cooled, once the desired conversion has occurred.

In more specific terms, we have found that the reaction mass should be brought quickly to and maintained at a temperature of from about 140 to 200° C. for a total period not exceeding about 5 minutes. To accomplish this rapid heating of the mass and the subsequent cooling, it has been found particularly desirable, as shown in Examples 1 and 2, to feed the reactant streams continuously and simultaneously into one end of a suitably heated, elongated reaction zone, i.e., one which is characterized by having its greatest dimension in the direction of flow of the reaction mass, at rates such that turbulent flow is produced and maintained in the mass in the reaction zone, and to discharge the reaction mass continuously from the opposite end of the reaction zone directly into the cooling zone. This type of reactor not only permits accurate control of retention time, but also permits rapid removal of the products from contact with the starting materials. In addition, it facilitates intimate mixing of the reaction mass by the preferred method of turbulent flow. As is well understood in the engineering arts, turbulent flow occurs when operating under conditions such that the Reynolds number is 2500 or greater.

As previously mentioned, the reaction zone in our process should be maintained at a temperature of from about 140 to 200° C. If the temperature in the zone drops much below this range, we have found that the reaction rates in our process become progressively lower, thus necessitating retention times substantially in excess of 5 minutes with consequent losses of starting materials by excessive conversion to by-products. This, of course, materially reduces the efficiency of the synthesis. As the temperature in the reaction zone approaches 200° C., conversions particularly of the terephthalic acid to the desired ester product drop off, chiefly because of hydrolytic reactions.

Temperatures in the range of 160 to 180° C. in the heated reaction zone have been found to be particularly effective and to permit excellent conversions at retention times of 3.5 minutes or less, and operation at such temperatures represents a preferred embodiment of the invention. In general, retention of the mass in the preferred temperature range for about 0.5 to 3 minutes is preferred for good to excellent conversions to DHET and, as the runs of Example 2 indicate, retention times of sure at least sufficient to maintain the major part of the reactants, in particular the ethylene oxide and the water, in the liquid phase. Generally speaking, pressure will be maintained in the range of about 150 to 1200 p.s.i.ga. and, more particularly, at 160 to 300 p.s.i.ga. at the preferred operating temperatures.

The cooling zone into which the reaction mass is discharged should be at a temperature below about 100° C., and preferably below about 80° C., in order that reaction therein will come rapidly to a halt. Although complete conversion of all the free terephthalic acid is readily possible even under our preferred conditions of temperature and retention time, it generally is desirable to effect the reaction so that a small amount of free terephthalic acid, e.g., up to about 1%, remains in the product. Accordingly, we prefer to maintain the temperature in the cooling zone above about 60° C. in order that these small amounts of solid terephthalic acid may be removed from the reaction mass prior to the recovery of the glycol terephthalate products via conventional crystallization procedures. Temperatures of 60 to 80° C. have been found particularly suitable in the cooling zone, and such temperatures are preferred.

Under our preferred process conditions, we have found that the slurry fed to the reactor should include at least about 6 moles of water per gross mole of terephthalic acid in order to obtain a readily flowable process stream. On the other hand, competing reactions, particularly hydration of ethylene oxide to ethylene glycol, become excessive when more than 20 moles of water are provided per mole of the starting acid. Water-to-terephthalic acid mole ratios between 8 and 15 are generally suitable and those of the order of 10 to 12 are preferred.

As was recognized heretofore, a small amount of an alkaline material must be present in the reaction mixture for adequate conversions to DHET to occur within reasonable periods of time. The alkaline material converts a portion of the terephthalic acid to a soluble salt, and it is this soluble form with which the ethylene oxide reacts. As the soluble form is consumed by conversion, more of the solid terephthalic acid is converted by the base to the soluble, reactive form. Hence, the base may be said to function primarily as an agent for transferring the terephthalic acid from an inactive to an active anionic form.

Any water-soluble base may be used in the present process, but from the standpoints of the original cost and the relative amounts of material required, ammonia and the alkali-metal hydroxides are preferred. Since the base in the process is present in an aqueous solution, the terms "ammonia" and "ammonium hydroxide" may, for practical purpose, be considered to be equivalent for purposes of the present invention. Generally speaking, however, ammonium hydroxide is somewhat less desirable than the alkali-metal hydroxides, particularly sodium hydroxide, because the lower water-solubility of the resulting ammonium terephthalate not only requires that a relatively larger amount be used but also has the effect of slowing the desired reaction so that the competing reaction of ethylene oxide hydration occurs to a greater extent.

As was alluded to briefly hereinabove, we have found that reaction of one mole of alkali with one mole of terephthalic acid does not yield one mole of the monoalkali salt of the acid. Rather, such an equimolecular mixture disproportionates into an equimolecular mixture of the dialkali salt and free terephthalic acid. Hence, in calculating conversions based on "available" terephthalic acid, we have considered the entire amount of base present to be bound as neutral terephthalate.

In general, we have found that, under our process conditions, from about 0.10 to 0.50 mole of the water-soluble base should be provided per gross mole of terephthalic acid. An amount of base below the specified minimum makes the desired reaction excessively slow and facilitates the undesired side reaction of ethylene oxide hydration. The upper limit on the base concentration is dictated not only by solubility considerations but also by requirements of material recovery. The greater the amount of the terephthalic acid which is bound with base and hence unavailable for reaction with ethylene oxide when no more free terephthalic acid is present, the greater the amount which must be recovered and recycled if the process is to be operated economically. Preferably the water-soluble base, which may be added per se or, after the start of the process, may be added partially or totally as neutral terephthalate, e.g., disodium terephthalate, is used in an amount to provide from about 0.15 to 0.25 mole per gross mole of the acid.

The formation of DHET from ethylene oxide and terephthalic acid theoretically requires two moles of the oxide per mole of the acid, but in actual practice, we have found that the proportion fed may range from about 1.8 to 2.8 moles per mole of the acid and that from 2.0 to 2.5 moles per mole is preferable. Larger excesses of ethylene oxide are undesirable in that large amounts must be recovered and in that the aforementioned competing reaction of hydration of the oxide occurs to an excessive extent.

The DHET obtained by the process of the invention can be used with or without the minor amounts of mono-($\beta$-hydroxyethyl) terephthalate formed therewith in the preparation of polymers by procedures well-known in the art. Although we have provided a detailed description of our improved process for preparing this useful ester, it will be obvious to those skilled in the art that many variations are possible within the spirit and scope of the invention. Hence, we intend to be limited only by the following claims.

We claim:

1. In a process for the preparation of di($\beta$-hydroxyethyl) terephthalate by the reaction of ethylene oxide with terephthalic acid, the improvement which comprises forming a reaction mass by continuously feeding ethylene oxide and a slurry prepared from terephthalic acid, water, and a water-soluble base selected from the group consisting of ammonium hydroxide and the alkali-metal hydroxides into one end of a heated reaction zone which has its greatest dimension in the direction of flow of said mass and is maintained at a temperature between about 140 and 200° C. at a pressure at least sufficient to maintain the major portion of said mass in the liquid phase, thoroughly mixing the components of the reaction mass in the heated zone, said reaction mass containing per mole of terephthalic acid fed from about 1.8 to 2.8 moles of ethylene oxide, from about 6 to 20 moles of water, and from about 0.10 to 0.50 mole of said water-soluble base, and continuously discharging the reaction mass from the other end of said heated reaction zone into a cooling zone in such manner as to bring said mass quickly to a temperature between about 60 and 100° C. after a residence time under the temperature conditions of said heated reaction zone of from about 0.5 to 5 minutes.

2. The process as claimed in claim 1, wherein the temperature in said heated reaction zone is maintained between about 160 and 180° C.

3. The process as claimed in claim 1, wherein from 2.0 to 2.5 moles of ethylene oxide are provided per mole of terephthalic acid fed to said heated reaction zone.

4. The process as claimed in claim 1, wherein from 8 to 15 moles of water are provided per mole of terephthalic acid fed to said heated reaction zone.

5. The process as claimed in claim 1, wherein from 0.15 to 0.25 mole of said water-soluble base is provided per mole of terephthalic acid fed to said heated reaction zone.

6. The process as claimed in claim 1, wherein the discharged mass is brought to a temperature between 60 and 80° C. in said cooling zone.

7. The process as claimed in claim 1, wherein the residence time under the temperature conditions of said heated reaction zone is from 1.5 to 3 minutes.

8. In a process for the preparation of di($\beta$-hydroxyethyl) terephthalate by the reaction of ethylene oxide with terephthalic acid, the improvement which comprises forming a reaction mass by continuously feeding ethylene oxide and a slurry prepared from terephthalic acid, water, and sodium hydroxide into one end of a heated reaction zone which has its greatest dimension in the direction of flow of said mass and is maintained at a temperature between about 160 and 180° C. at a pressure at least sufficient to maintain the major portion of said mass in the liquid phase, said feeding being effected in such manner as to provide intimate mixing of said mass and to provide per mole of terephthalic acid fed from 2.0 to 2.5 moles of ethylene oxide, from 10 to 12 moles of water, and from 0.15 to 0.25 mole of sodium hydroxide, and continuously discharging the reaction mass from the other end of said heated reaction zone into a cooling zone in such manner as to bring said mass quickly to a temperature between about 60 and 80° C., after a residence time under the temperature conditions of said heated reaction zone of from 1.5 to 3 minutes.

References Cited in the file of this patent

FOREIGN PATENTS

| | | |
|---|---|---|
| 623,669 | Great Britain | May 20, 1949 |
| 205,719 | Australia | Jan. 21, 1957 |